United States Patent
Nilsson et al.

(10) Patent No.: US 7,552,542 B2
(45) Date of Patent: Jun. 30, 2009

(54) MEASURING ARRANGEMENT AND MEASURING METHOD FOR MEASURING BEARING CLEARANCE

(75) Inventors: Per Nilsson, Ljungsbro (SE); Andre Thomas, Hamburg (DE); Andreas Kammlott, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 83 days.

(21) Appl. No.: 11/977,166

(22) Filed: Oct. 23, 2007

(65) Prior Publication Data

US 2008/0115378 A1 May 22, 2008

Related U.S. Application Data

(60) Provisional application No. 60/853,608, filed on Oct. 23, 2006.

(30) Foreign Application Priority Data

Dec. 13, 2006 (DE) .................... 10 2006 058 903

(51) Int. Cl.
*G01B 5/14* (2006.01)
*G01D 21/00* (2006.01)
(52) U.S. Cl. ........................................ 33/517
(58) Field of Classification Search ............ 33/517
See application file for complete search history.

(56) References Cited

U.S. PATENT DOCUMENTS

| | | | | |
|---|---|---|---|---|
| 1,317,459 A | * | 9/1919 | Rouanet | 33/517 |
| 3,005,265 A | * | 10/1961 | Martin, Jr. et al. | 33/517 |
| 3,144,718 A | * | 8/1964 | Brehm | 33/517 |
| 3,146,528 A | * | 9/1964 | Goulet et al. | 33/573 |
| 3,220,244 A | * | 11/1965 | Donnelly | 73/37.6 |
| 4,200,987 A | * | 5/1980 | Schmitt | 33/501.4 |
| 4,338,726 A | * | 7/1982 | Swailes | 33/517 |
| 4,347,667 A | * | 9/1982 | Albertazzi | 33/517 |
| 4,790,079 A | * | 12/1988 | Meyers | 33/517 |
| 4,993,165 A | * | 2/1991 | French et al. | 33/606 |
| 5,070,621 A | * | 12/1991 | Butler et al. | 33/517 |
| 6,021,580 A | | 2/2000 | Manfredotti et al. | |
| 6,257,078 B1 | * | 7/2001 | Vencill | 73/865.9 |
| 6,588,119 B1 | * | 7/2003 | Russell et al. | 33/517 |

FOREIGN PATENT DOCUMENTS

| | | |
|---|---|---|
| DE | 222973 | 6/1910 |
| DK | DD 3690 | 6/1953 |
| DK | DD 217307 | 1/1985 |

OTHER PUBLICATIONS

German Patent Examination Report dated Sep. 5, 2007.

* cited by examiner

*Primary Examiner*—Christopher W Fulton
(74) *Attorney, Agent, or Firm*—Jenkins, Wilson, Taylor & Hunt, P.A.

(57) ABSTRACT

A measuring arrangement for measuring clearance between a bearing internal part and a bearing external part of a bearing, in particular in an aircraft or spacecraft, is disclosed. The idea underlying the measuring arrangement is to adjust the bearing part relative to the bearing external part with an adjusting device and to measure the adjustment carried out with a measuring device. The advantage according to the measuring arrangement is that a much more accurate and repeatable measuring may be achieved relative to current measuring which depends on the intuition and experience of the mechanic.

14 Claims, 9 Drawing Sheets

MEASURING ARRANGEMENT AND MEASURING METHOD FOR MEASURING BEARING CLEARANCE

CROSS-REFERENCE TO RELATED APPLICATIONS

This application claims the benefit of U.S. Provisional Application No. 60/853,608, filed Oct. 23, 2006 and German patent application No. 10 2006 058 903.3 filed Dec. 13, 2006, the entire disclosures of which are herein incorporated by reference.

FIELD OF THE INVENTION

The present invention relates to a measuring arrangement and a measuring method for measuring clearance between a bearing internal part and a bearing external part of a bearing, in particular in an aircraft or spacecraft.

BACKGROUND OF THE INVENTION

Although usable for any bearings, the present invention, as well as the problem underlying the invention, are explained in more detail with reference to a pivot bearing of an aircraft, which connects a rudder unit to a rudder in an articulated manner.

An example of such a pivot bearing known to the applicant is shown in FIG. 8 in a perspective view and in FIG. 9 in a perspective sectional view C-C of FIG. 8.

A connecting arrangement 1 for connecting a rudder to a rudder unit of an aircraft in an articulated manner comprises a bearing fitting 2 associated with the rudder and a bearing fork 3 associated with the rudder unit, which are fastened to one another in an articulated manner via a pivot bearing 4. As may be seen in FIG. 9, the pivot bearing 4 comprises a spherical bearing internal part 6 fixedly provided on a bearing bolt 5, which is in sliding connection with a shell-shaped bearing external part 7 fixedly provided on the bearing fitting 2. Retaining means 8, 9, 10 are provided in order to retain the bearing bolt 5 as well as the bearing internal part 6 releasably on the bearing fork 3. When the rudder is deflected, the bearing external part 7 pivots about the bearing internal part 6.

Wear in the pivot bearing 4, in particular, may result in linear mobility between the bearing internal part 6 and the bearing external part 7. This is referred to as bearing clearance and has to be monitored at regular intervals, in order to ensure functional reliability of the aircraft. Too much bearing clearance may result in, for example, vibrations, loss of comfort, control problems, or even loss of the rudder unit during the operation of the aircraft.

Currently, the bearing clearance is tested by an experienced mechanic, who manually shakes the rudder and judges according to his intuition and experience, whether an impermissibly large bearing clearance is present. Such manual testing is very inaccurate. As a result, for example, it may lead to premature replacement of bearings, which leads to high costs. Alternatively, however, a faulty pivot bearing is not replaced and this results in control problems of the aircraft during operation.

A further difficulty is that, in principle, a plurality of the connecting arrangements shown in FIGS. 8 and 9 are provided concentrically above one another, said connecting arrangements connecting the rudder at a plurality of points to the rudder unit in an articulated manner. For the mechanic, it is not possible simply by shaking to determine which of the plurality of pivot bearings has increased bearing clearance. This is because by shaking the rudder the mechanic applies force to all the bearing external parts and not simply to a single bearing external part. In case of doubt, all pivot bearings consequently have to be removed and/or the rudder dismantled and individually tested. This leads, however, with regular maintenance work, to high costs and is only possible with specific, costly equipment.

SUMMARY OF THE INVENTION

It is, therefore, an object of the present invention to provide a measuring arrangement and/or a measuring method which allows a simple, reliable measurement of clearance of a bearing internal part relative to a bearing external part, in particular on control surfaces of an aircraft or spacecraft.

Accordingly, a measuring arrangement is provided for measuring clearance between a bearing internal part and a bearing external part of a bearing, in particular in an aircraft or spacecraft. The measuring arrangement further comprises an adjusting device for adjusting the bearing internal part relative to the bearing external part and a measuring device for measuring the adjustment carried out.

Moreover, a method for measuring bearing clearance between a bearing internal part and a bearing external part, in particular in an aircraft or spacecraft, is provided with the following method steps: adjusting the bearing internal part from a first bearing position of the bearing internal part on the bearing external part to a second bearing position on the bearing external part opposing the first bearing position, with an adjusting device for adjusting the bearing internal part relative to the bearing external part; and measuring the effected adjustment with a measuring device.

The idea underlying the present invention consists in that the measurement of the bearing clearance is carried out in a mechanized manner—rather than manually. The mechanized measurement of the bearing clearance allows a very accurate, reliable and repeatable measurement. This makes it possible to replace the bearing merely when it is actually worn.

Moreover, simple measuring of the bearing clearance in-situ is possible without requiring the removal of the rudder. In this connection, each pivot bearing may be tested individually with regard to its bearing clearance. The operational reliability of the aircraft is thus increased.

Moreover, it is substantially easier to move the bearing internal part relative to the fixed bearing external part, as the bearing external part is fastened fixedly to the bearing fitting of the rudder which weighs several hundred kilograms, the inertia thereof having to be overcome when shaken, as with the known idea.

Advantageous embodiments and improvements of the invention are found in the sub-claims.

In the present case, the term "adjustment" is understood to be a movement of the bearing internal part relative to the bearing external part along a linear or curved path. The measurement between two points thus may encompass the measurement of the distance, for example, in micrometers, along a linear connection between the two points.

In the present case, the term "bearing fitting" is always understood to be the component which comprises the bearing external part. The bearing external part may be fixedly mounted in the bearing fitting. In a further embodiment of the invention, the adjusting device acts directly on the bearing internal part. Thus very accurate measurement results may be achieved with a high degree of repeatability. An adjustment of the bearing bolt, described in the introduction, in the plane perpendicular to its longitudinal axis might also be conceivable, but appears to be less accurate. For example, different bearing bolts may have different tolerances. An adjustment of said tolerances with the adjusting device might therefore lead to different measuring results. The adjusting device may therefore comprise a measuring element which may be secured in the bearing internal part. Such a measuring element may be produced very accurately and may be adjusted to the measurement, so that a repeatable measurement may be carried out which is as accurate as possible.

Furthermore, the measuring element is typically configured as a measuring bolt which may be inserted into a bore of the bearing internal part. This idea is particularly simple, in that a bore is already provided in the bearing internal part for receiving the bearing bolt. Such a precisely fitting measuring bolt may thus be attached easily to the bearing internal part and leads to very accurate measuring results.

According to a further embodiment of the invention, the adjusting device comprises an engagement means which may be brought into engagement with the measuring element. Such a multipart construction makes it possible firstly to attach the measuring element fixedly to and/or in the bearing internal part at least in the adjusting plane, and in a further step to bring the adjusting device into engagement with the measuring element by means of the engagement means. This already appears advantageous for reasons of the geometry of the bearing fork and/or the bearing fitting.

In a further embodiment of the invention, the adjusting device comprises a rotational axis about which the engagement means may be pivoted. As a result, the measuring element secured to the bearing internal part may be very easily adjusted.

The adjusting device may comprise fastening means within its rotational axis, with which the adjusting device may be secured to a bearing fitting of the bearing. Thus it is possible to adjust the bearing internal part relative to the bearing external part in a simple manner.

The fastening means may be configured as a clamping device for clamping the adjusting device to the bearing fitting. Clamping the adjusting device to the bearing fitting saves time and thus again allows easy release of the adjusting device from the bearing fitting.

According to a further embodiment of the invention, a force measuring device is provided for a repeatable measurement of the adjustment, with which a force applied by the adjusting device to the bearing internal part may be measured. This allows the bearing internal part to be applied on the bearing external part always with the same amount of force. This increases the repeatability of the measurement, as the applied force influences the adjustment carried out. For example, the application of a variable force leads to variable resilient deformations of the bearing internal part and/or bearing external part in the bearing region thereof which results in variable measuring results.

In a further embodiment of the invention, the force measuring device is configured as a resilient lever by means of which the engagement means may be pivoted about the rotational axis. If the bearing internal part is brought to bear against the bearing external part by means of the adjusting device, as already explained above, it may be necessary to position the bearing internal part with a defined force on the bearing external part. During the adjustment, therefore, the resilient lever does not bend. Only when the bearing internal part is pressed against the bearing external part, does the resilient lever deform due to the force applied, for example manually, to the end thereof. The force, by means of which the bearing internal part is pressed onto the bearing external part, may be easily measured on the basis of said resilient deformation.

Particularly, the force which may be diverted from the resilient deformation of the resilient lever may be read on a scale of the force measuring device. Directly determining the force in such a manner is reliable and is entirely possible without electronic aids. Naturally, however, additional electronic aids could be provided in order to allow an even more accurate measurement and, for example, to store the measured data in a storage device for subsequent evaluation.

According to a further embodiment of the invention, the engagement means comprises at least one jaw part for partially engaging around the measuring bolt, such as on its periphery. As a result of the geometric ratios of the bearing fitting and/or the bearing fork, the use of such a jaw part is particularly considered as said jaw part may be brought by a linear movement of the adjusting device into engagement with the measuring bolt.

The engagement means may comprise two jaw parts for gripping the measuring bolt at opposing ends. As a result, a uniform force introduction into the bearing internal part is ensured and tilting of the measuring bolt is prevented relative to the direction of adjustment.

Furthermore, the jaw may be configured to be flat, such that it may be inserted between a bearing fitting and a bearing fork of the bearing towards the measuring bolt. This is also advantageous for geometric reasons, i.e. in order to prevent a collision between the jaw and the bearing fitting and/or the bearing fork.

In a further embodiment of the invention, the adjusting device comprises positioning means within its rotational axis for positioning the adjusting device relative to the bearing external part. Even when the fastening of the adjusting device has already taken place, for example via fastening means, by providing additional positioning means, even minimal displacements of the pivot point relative to the bearing external part and/or bearing fitting may be prevented, which could lead to an inaccurate measurement result.

In a further embodiment of the invention, the measuring device is configured as a dial gauge. Dial gauges usually comprise a measuring scale as well as a measuring sensor controlling said measuring scale and permit a very simple measurement of the adjustment carried out by means of the adjusting device.

The dial gauge may comprise a measuring sensor which may be positioned under spring tension on the measuring element or the bearing internal part. This ensures that the measuring sensor at any time, i.e. while the bearing internal part is adjusted, follows the movement thereof and thus an accurate measurement is achieved.

The measuring sensor may be inserted into a recess in the measuring bolt and may be positioned on an internal wall of the bearing internal part. As a result, an even more accurate measurement is possible as a measurement of the adjustment carried out on the measuring bolt itself, for example, is subject to the manufacturing tolerances thereof.

With regard to the method according to the invention, "opposing" is preferably understood to be a diametric arrangement of the first and second bearing position relative to the diameter of the bearing external part. Nevertheless, an obliquely opposing arrangement is also possible.

According to a further embodiment of the method according to the invention, at the first and second bearing position respectively the same amount of force is applied to the bearing internal part in order to press down the bearing internal part against the bearing external part by means of the adjusting device. This increases, as already disclosed above, the repeatability of the measurement.

According to one embodiment of the method according to the invention, the bearing bolt of the bearing is replaced before the adjustment of the bearing internal part relative to the bearing external part by a measuring element. This measure makes it possible to move the bearing internal part unhindered relative to the bearing external part.

In one embodiment of the invention, after the replacement of the bearing bolt by the measuring element, said measuring element is brought into engagement with an engagement means of the adjusting device. By means of this process, the geometric requirements may be easily taken into account.

According to a further embodiment of the invention, the effective portion for adjusting the bearing internal part is pivoted from the first bearing position into the second bearing position. In terms of construction, such a pivoting may be implemented more easily relative to a linear adjustment.

BRIEF DESCRIPTION OF THE DRAWINGS

The invention is described in more detail hereinafter with reference to embodiments and by referring to the accompanying figures of the drawings, in which.

In the figures, the same reference numerals denote components which are the same or functionally the same, provided that nothing contrary is provided.

DETAILED DESCRIPTION OF THE INVENTION

Figure 1:
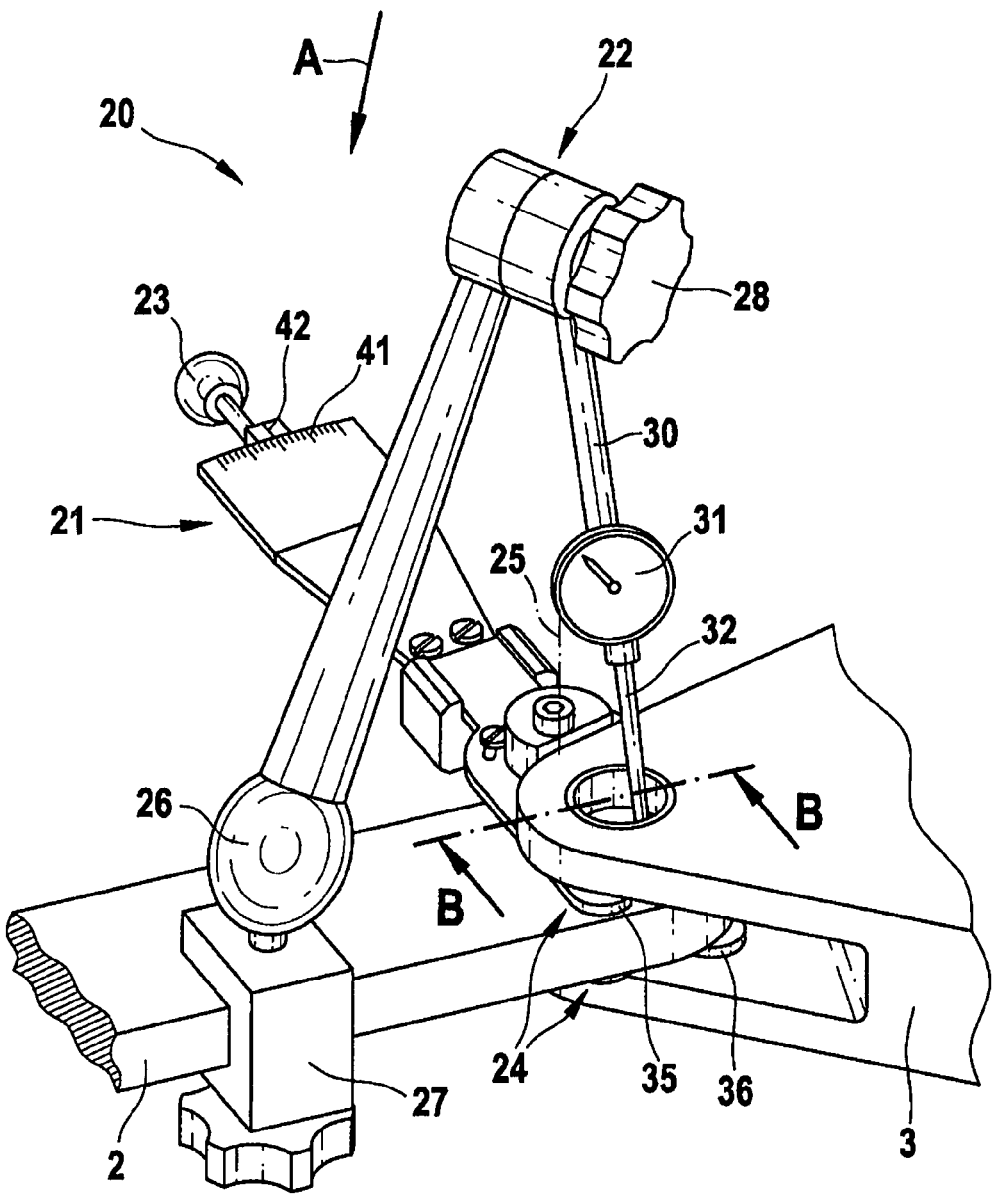
FIG. 1 shows a measuring arrangement provided on an articulated connection between a bearing fitting and a bearing fork according to an embodiment of the present invention.
Figure 8:
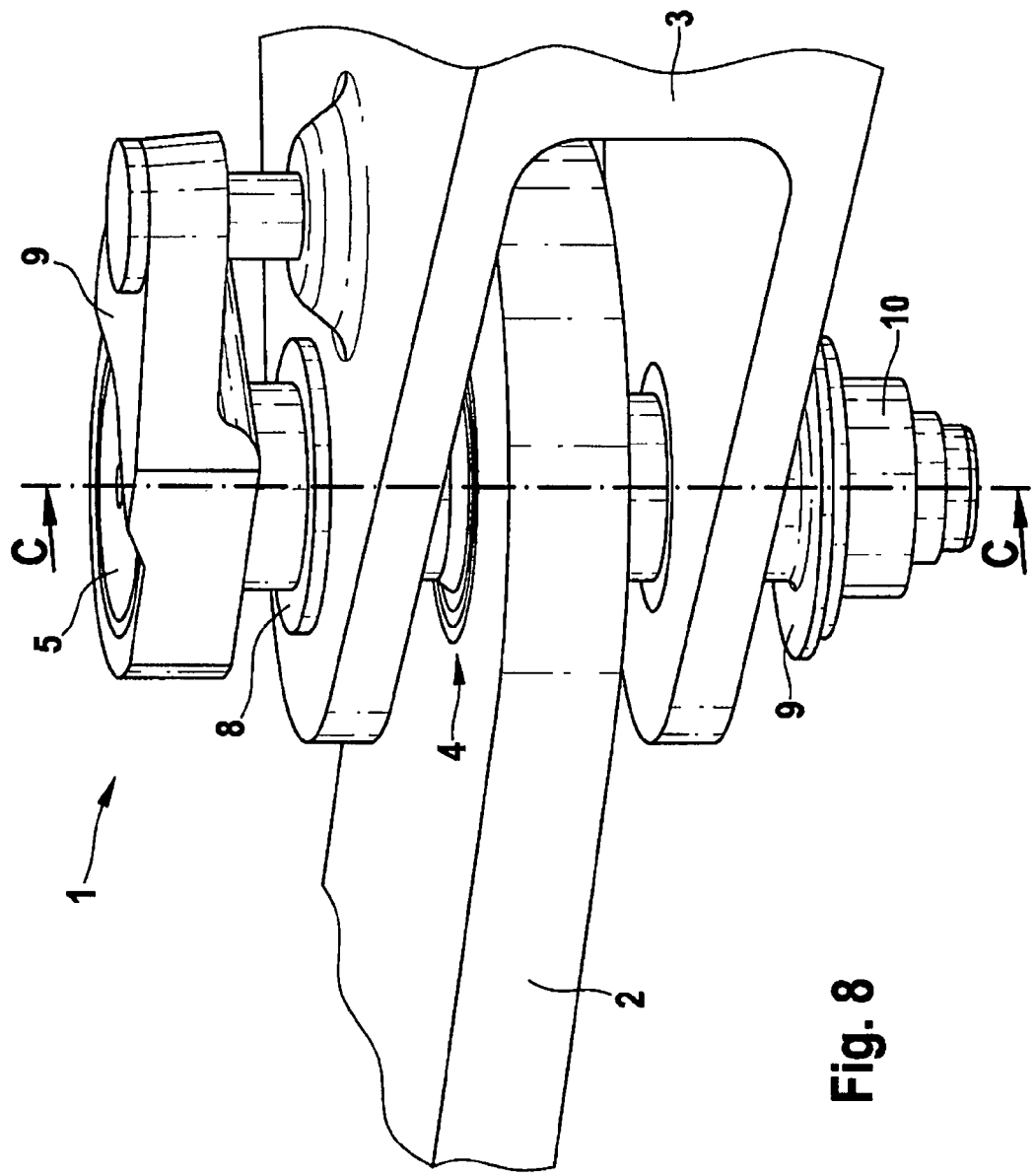
FIG. 8 shows a perspective view of the known connecting arrangement, shown in FIG. 1, for the articulated connection of a bearing fitting of a rudder to a bearing fork of a rudder unit.
Figure 9:
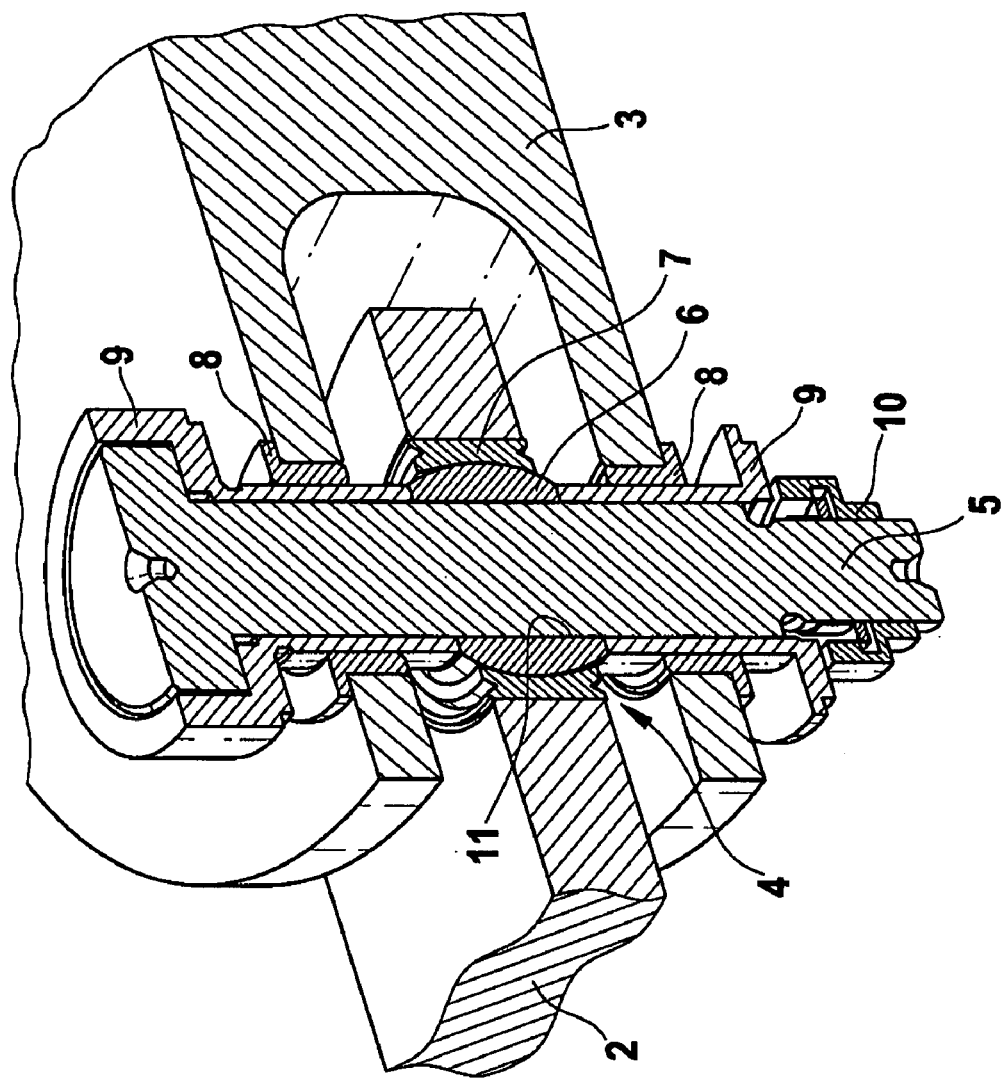
FIG. 9 shows a perspective sectional view along the cutting line C-C of FIG. 8.

FIG. 1 shows in perspective the arrangement 1 already described in FIGS. 8 and 9, with the bearing fitting 2 and the bearing fork 3. A measuring arrangement 20 which comprises an adjusting device 21 and a measuring device 22, may also be seen.

Figure 2:
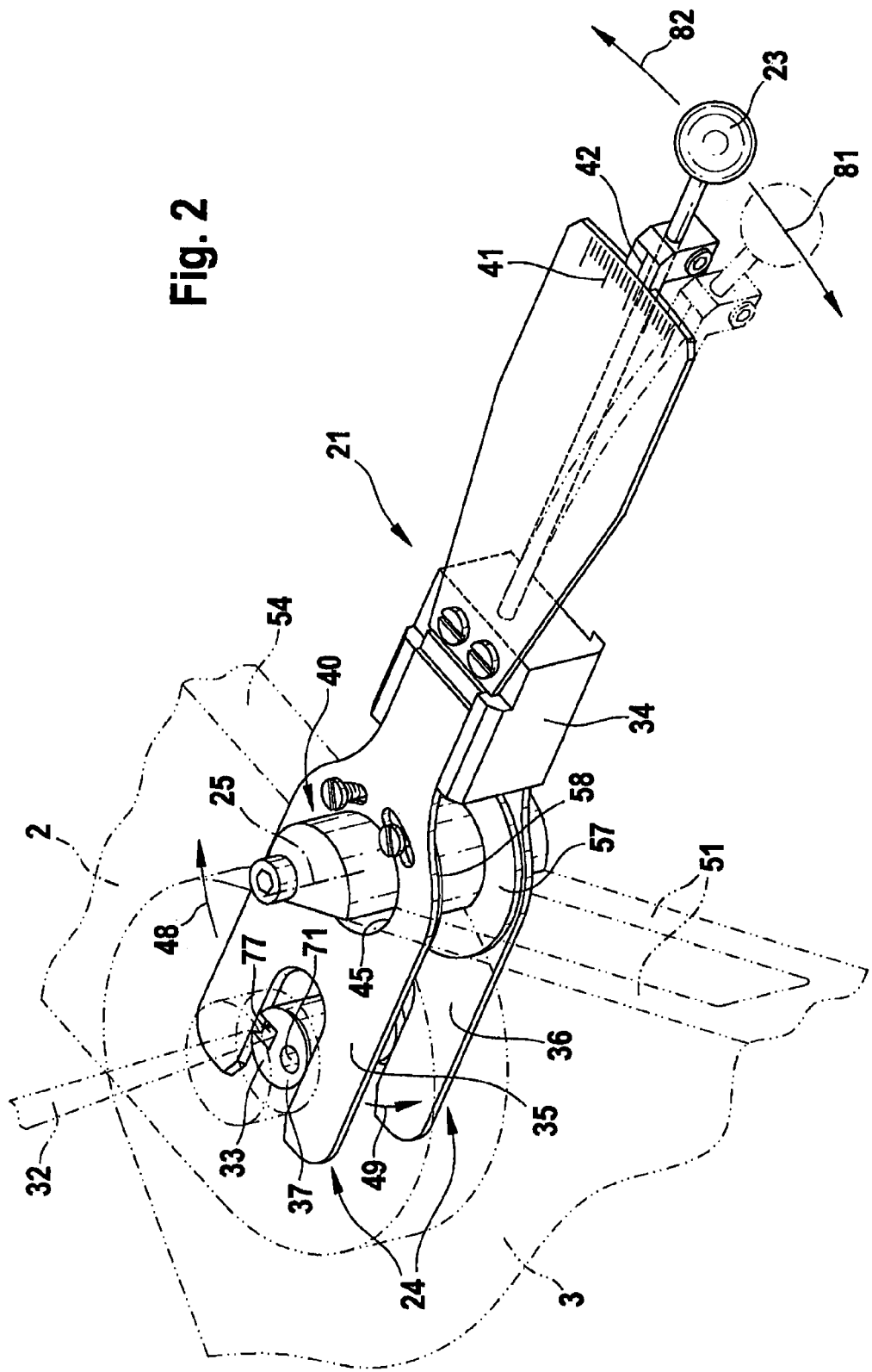
FIG. 2 shows a view A in the direction of the arrow viewed from FIG. 1.

Before the attachment of the measuring arrangement 20, the bearing bolt 5 shown in FIGS. 8 and 9 may be replaced by a measuring bolt 33, shown by way of example in FIG. 2, the retaining means 9, 10 being removed.

The adjusting device 21 consists of a lever 23, by means of which an engagement means 24 fixedly connected thereto may be pivoted about a rotational axis 25 secured to the bearing fitting 2.

The measuring device 22 is preferably secured at its one end 26 by means of a clamping block 27 to the bearing fitting 2. At its other end 30, which may be pivotable about a pivot axis 28 which may be fixed relative to the one end 26, a dial gauge 31 is provided with a measuring sensor 32 which, as shown in FIG. 4, is in contact with the bearing internal part 6.

FIG. 2 shows the adjusting device 21 in an enlarged perspective view, the bearing fork 3 being shown as transparent.

Figure 3:
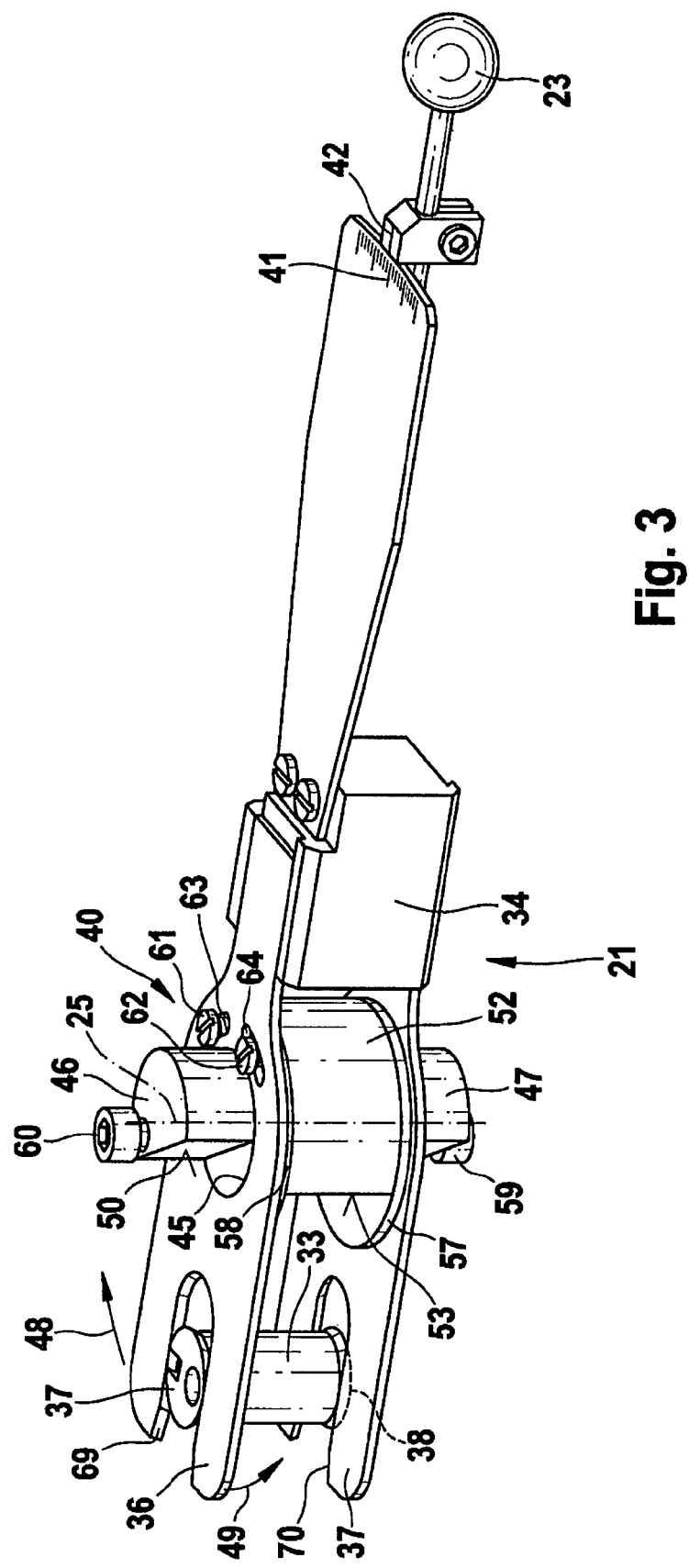
FIG. 3 shows a perspective view of the adjusting device of FIG. 1.
Figure 4:
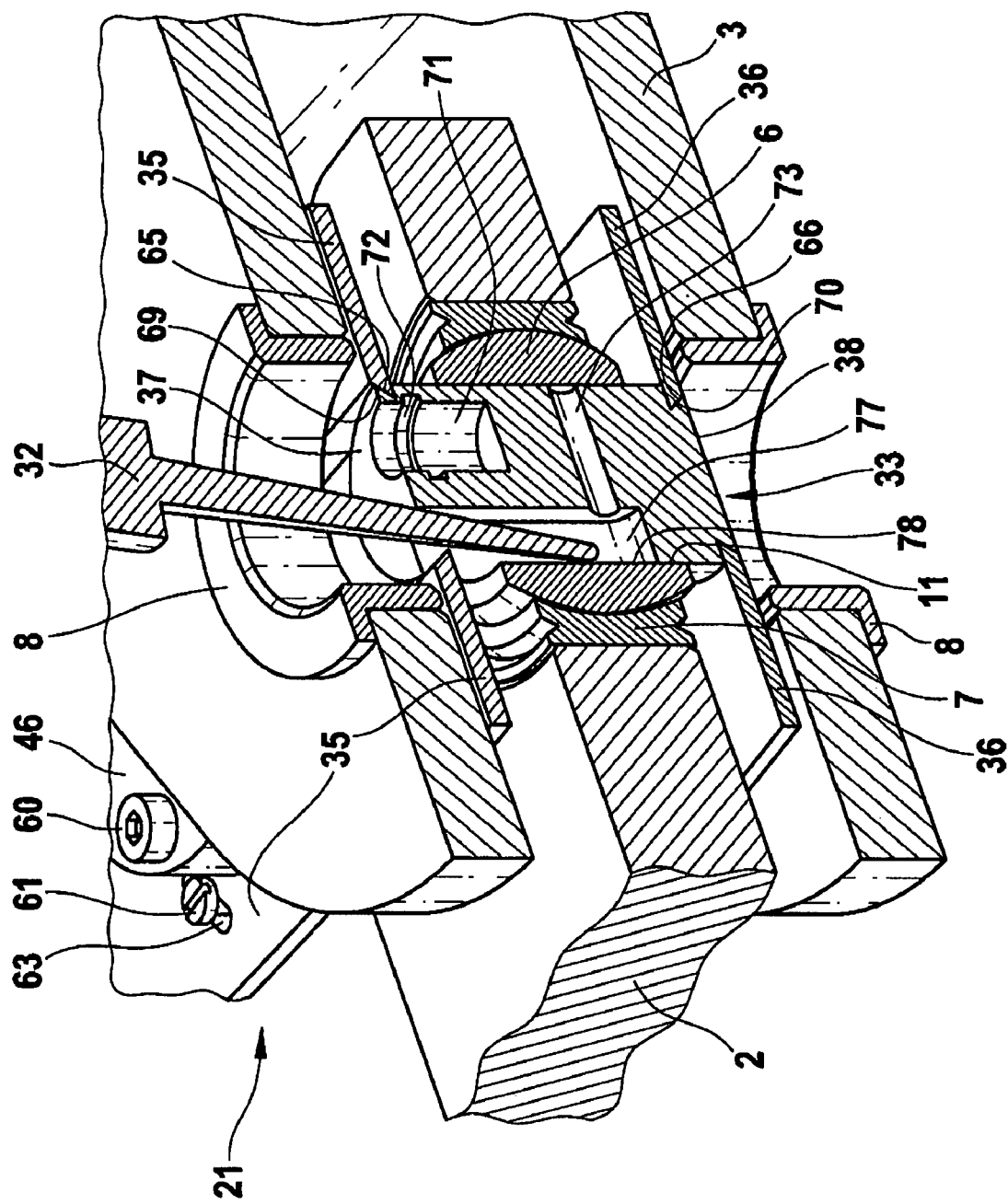
FIG. 4 shows a sectional view along the cutting line B-B of FIG. 1.

Upper and lower flat jaw parts 35, 36 are attached to a receiving part 34, which are in engagement with the measuring bolt 33 at its upper end 37 and/or lower end 38, as shown in FIG. 4. Clamping means 40 shown in more detail in FIG. 3 may be releasably fastened to the bearing fitting 2.

A scale 41 and the lever 23 made of spring elastic material, for example steel, are fastened to the receiving part 34 opposite the upper and lower jaw parts 35, 36. Moreover, the lever 23 comprises a pointer 42 opposing the scale 41.

The upper and lower jaw parts 35, 36 respectively comprise a concentric bore 45. Positioning portions 46, 47 associated with the bearing fork 3 are inserted through said bores. Said positioning portions serve firstly for retaining the adjusting device 21 in position, in particular when applying force to the lever 23. Secondly, the positioning portions 46, 47 have a bearing and guiding function for the upper and lower jaw parts 35, 36 to form the rotational axis 25.

By means of the lever 23, accordingly, the upper and lower jaw parts 35, 36 may be pivoted about the rotational axis 25. If a further movement of the upper and lower jaw parts 35, 36 in a pivoting direction 48 and/or 49 requires a considerable torque about the rotational axis 25, the resilient lever 23 bends as indicated in FIG. 2. Thus the pointer 42 also moves relative to the scale 41. Thus the force applied to the measuring-bolt 33 may be measured very easily.

FIG. 3 shows in perspective the adjusting device 21, in particular the construction of the clamping means 40 being able to be seen.

The positioning portions 46 and 47 associated with the bearing fork 3 are respectively preferably configured as profiled parts with an approximately crescent-shaped cross section 44 and a lateral face 50, the lateral face 50 being formed such that it follows the external contour 51 of the bearing fork 3.

The positioning portions 46, 47 associated with the bearing fork 3, are connected to one another via an intermediate positioning portion 52 associated with the bearing fitting 2. The positioning portion 52 associated with the bearing fitting 2 is preferably also configured as a profiled portion with an approximately crescent-shaped cross section and a lateral face 50, the lateral face 53 being formed such that it follows the external contour 51 of the bearing fitting 2.

Moreover, the clamping means 40 comprise clamping jaws 57 and 58 which, by means of screws 59, 60, for clamping the bearing fitting 2 may be moved towards one another and for releasing the bearing fitting may be moved away from one another.

Moreover, guide screws 61, 62 are tightly screwed into the positioning portion 52. The guide screws 61, 62 act with their shank as slide elements for slots 63, 64 in the upper jaw part 35. They therefore ensure a guided rotation of the upper jaw part 35 about the rotational axis 25.

FIG. 4 shows a perspective sectional view along the cutting line B-B of FIG. 1.

The measuring bolt 33 is preferably inserted with an interference fit into the bore 11 for the bearing bolt 5 in the spherical bearing internal part 6. At its upper and lower ends 37, 38 the measuring bolt 33 is provided with chamfers 65, 66 in opposing alignment relative to one another. These chamfers are in engagement with corresponding chamfers 69, 70 of the upper and/or lower jaw part 35, 36 and thus prevent the measuring bolt 33 from slipping in its longitudinal direction.

Moreover, the measuring bolt 33 comprises a receiver 71 for a ball locking bolt. The ball locking bolt (not shown) is, during the construction of the measuring arrangement, inserted into the receiver 71 and locked there in a groove 72. By means of the ball locking bolt the measuring bolt 33 is then inserted into the bore 11 in the bearing internal part 6. Preferably, moreover, a pressure element (not shown) is provided in a pressure element receiver 73. Said pressure element bears under spring tension against an internal wall 78 of the bore 11 and prevents the measuring bolt 33 from slipping out from the bearing internal part 6, as long as said bearing internal part has not yet been brought into engagement with the engagement means 24, i.e. the upper and lower jaw parts 35, 36.

Moreover, the measuring bolt comprises a recess 77 into which the measuring sensor 32 may be inserted, in order to position said measuring sensor on the internal wall 78 of the bearing internal part 6, for example under spring tension.

Figure 5:
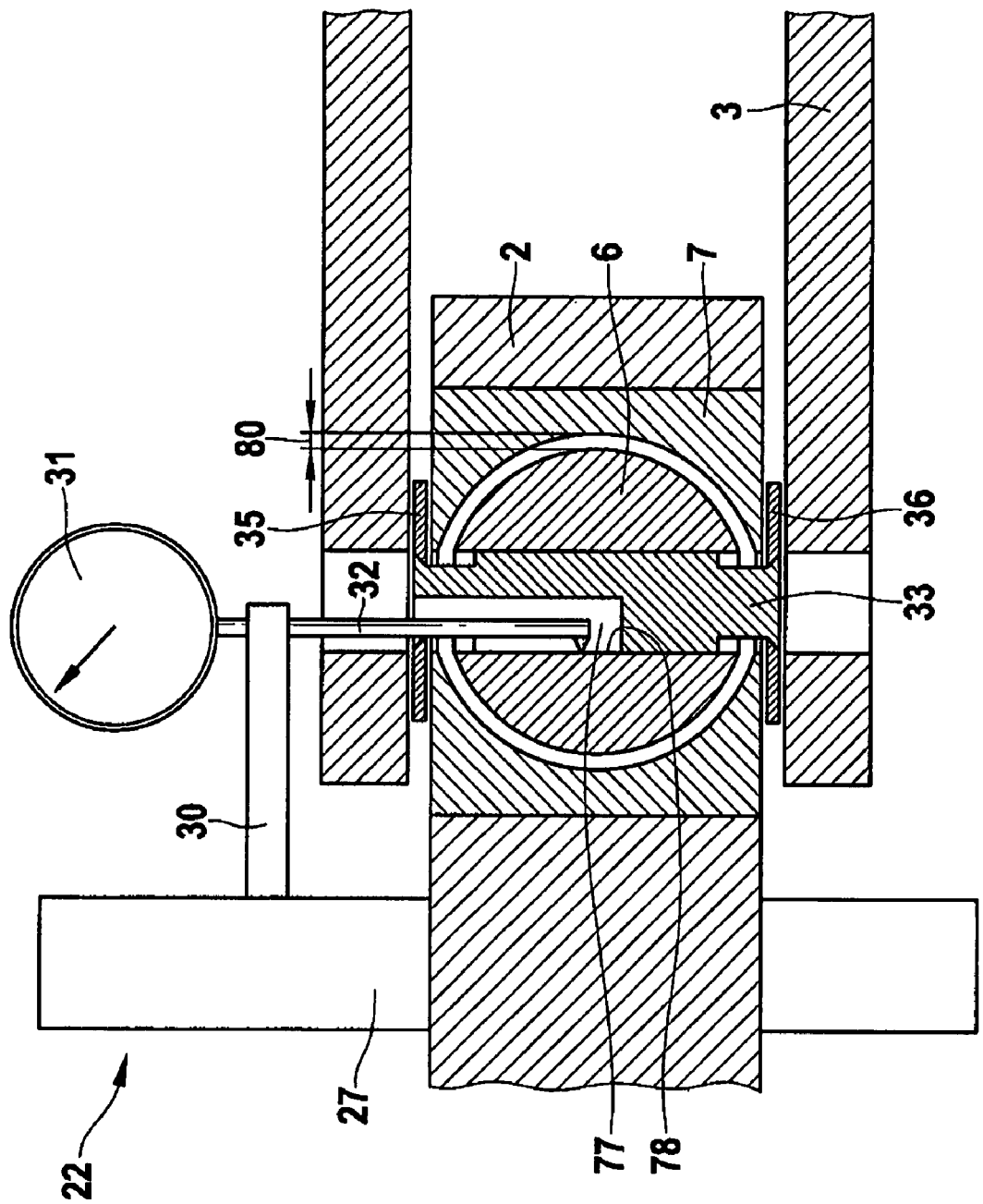
FIG. 5 shows schematically the section of FIG. 4, the bearing internal part being located in any position relative to the bearing external part.
Figure 6:
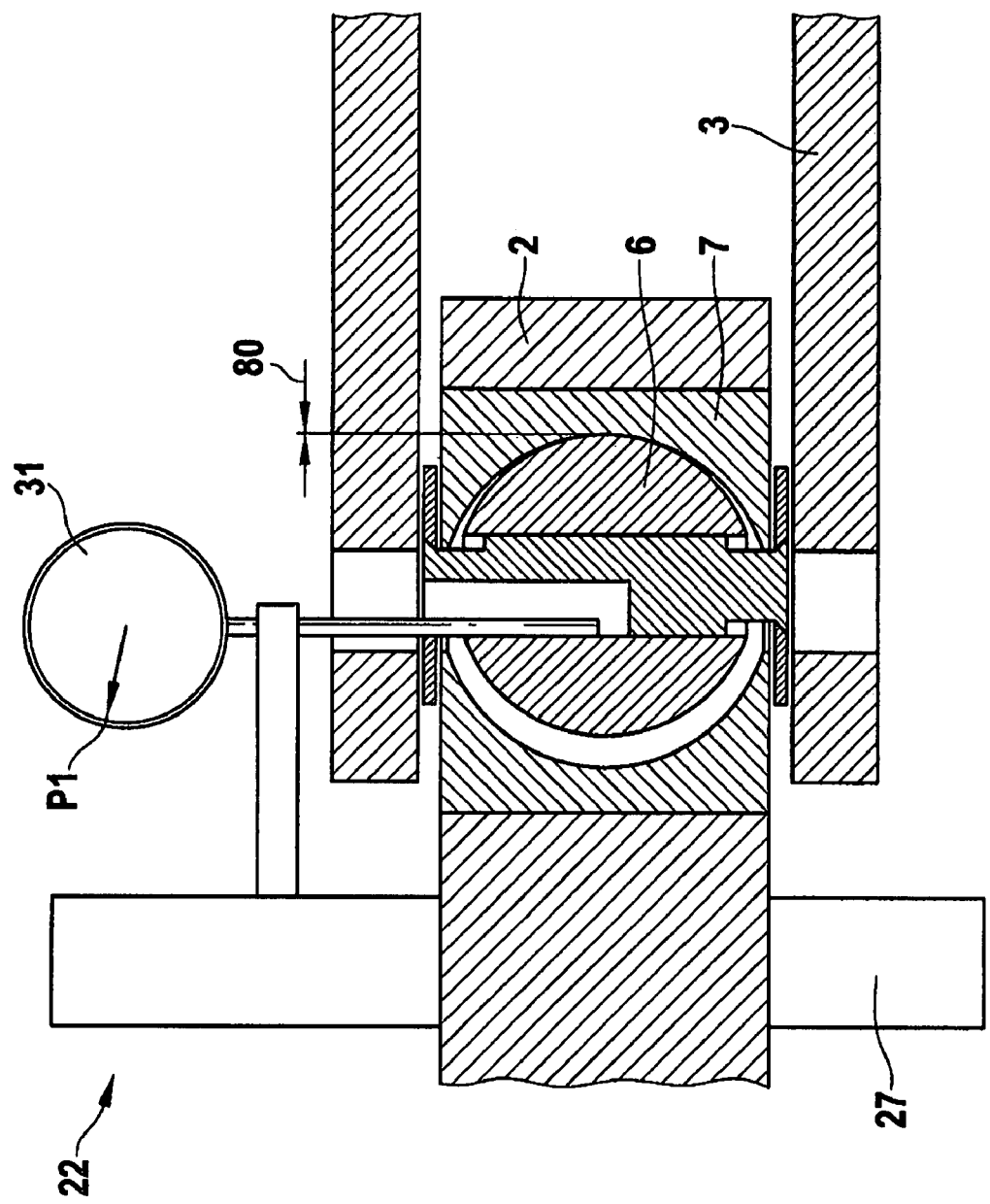
FIG. 6 shows the schematic view of FIG. 5, the bearing internal part being located in a first bearing position on the bearing external part.
Figure 7:
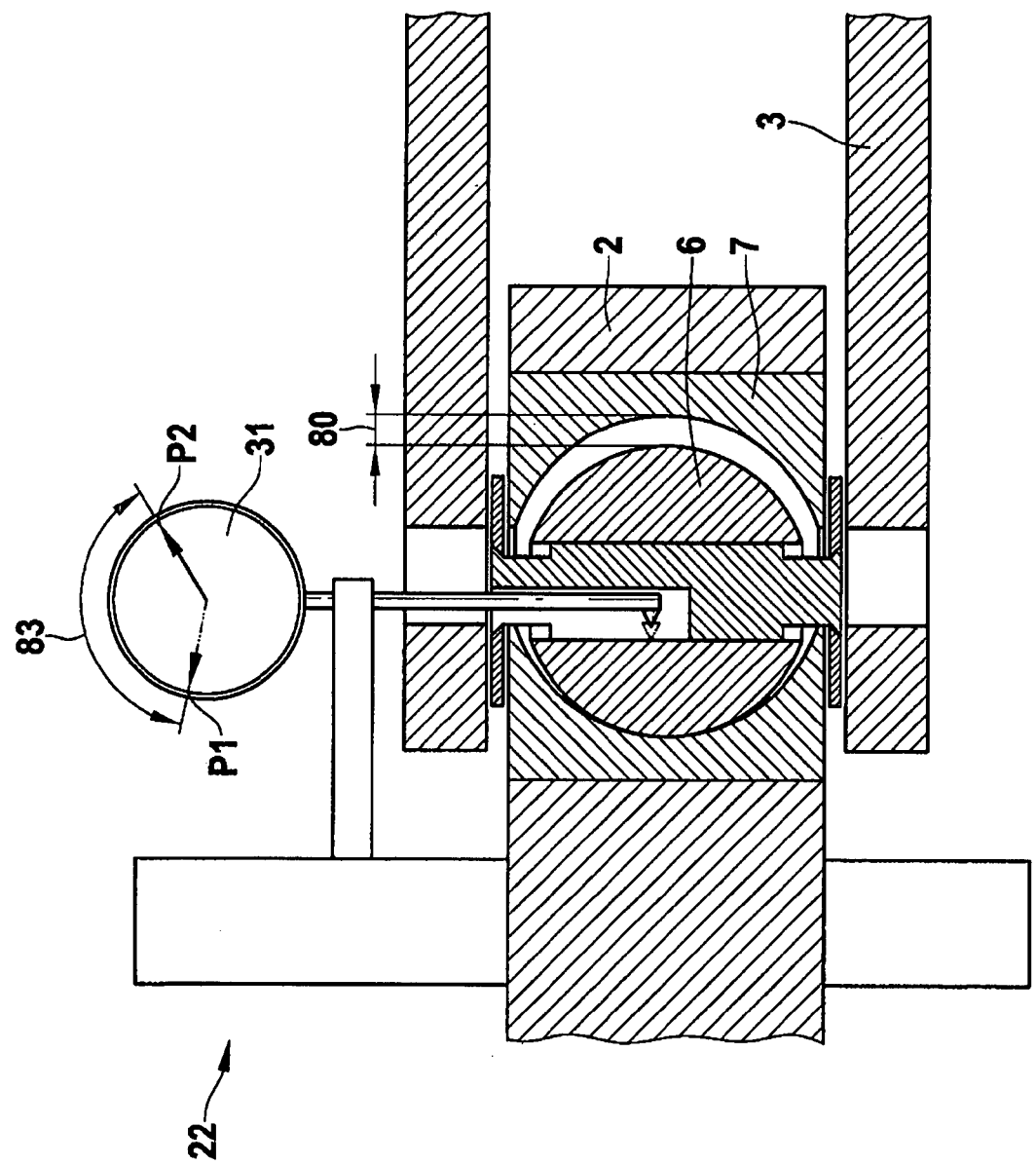
FIG. 7 shows the schematic view of FIG. 5, the bearing internal part being located in a second bearing position on the bearing external part.

FIGS. 5 to 7 show schematically the sectional view of FIG. 4 and illustrate the underlying measuring principle.

FIG. 5 shows a first method state during the measuring of the bearing clearance. The bearing bolt 5 shown in FIGS. 8 and 9 is removed from the bore 11 of the bearing internal part 6 and replaced by a measuring bolt 33. The bearing internal part 6 is located at any position relative to the bearing external part 7, the spacing between the bearing internal part 6 and the bearing external part 7 being provided with the reference numeral 80.

In a further method step the lever 23 is actuated in the direction of the arrow 81 as shown in FIG. 2. As a result, the jaw parts 35, 36 pivot in the direction of the arrow 48 in FIG. 2, until the bearing internal part 6 comes to bear against the bearing external part 7, as is indicated by the spacing 80 in FIG. 6 which is reduced to more or less zero. Subsequently, the lever 23 is acted upon by a defined force, in particular manually, in the direction of the arrow 81. Thus the lever 23 bends resiliently and the applied force may be read by the pointer 42 and the scale 41 as shown in FIG. 2. At this time, the dial gauge 31 is also reset, i.e. the measurement begins from this point at zero and is in the present case denoted by the bearing position P1.

Subsequently, the lever 23 is acted upon by a force in the opposing direction 82, as shown in FIG. 2. Thus the upper and lower jaw parts 35, 36 pivot in the direction 49 in FIG. 2, until the bearing internal part 6 comes to bear in an opposing manner. Also in this case, the same amount of force is again applied to the lever 23 in the direction 82. The bearing position adopted by the bearing internal part 6 is denoted by P2.

The path followed by the measuring sensor 32 is displayed on the associated dial gauge 31. The difference between the measured values for the bearing positions P1 and P2 corresponds to the bearing clearance 83 of the bearing 4.

As a result, by means of the present measuring arrangement and measuring method, a bearing clearance may be accurately and repeatably measured, without requiring the very costly removal of the rudder and/or the pivot bearing 4.

Alternatively, the measurement of the adjustment of the bearing internal part 6 relative to the bearing external part 7 may also take place without the application of a defined force. However, such a measurement might be less accurate.

As already explained, the lateral faces 50, 53 of the positioning portions 46, 47, 52 are formed such that they correspond to the corresponding contours 51, 54 of the bearing fitting 2 and/or the bearing fork 3. In order to measure the bearing clearance 83 on other pivot bearings, in particular those of the rudder, therefore, for example the lateral faces 50, 53 may be adapted to the geometry of the contours of the respective bearing fitting and/or the respective bearing fork. A modular system may, therefore, advantageously be provided in which a plurality of such adjusting devices 21 are provided, said adjusting devices, for example, differing in the design of the lateral faces 50, 53 or in the diameter of the measuring bolt 33.

Although the present invention has been described with reference to one embodiment, it is not restricted thereto, but may be modified in many different ways.

For example, the adjustment may be measured in a digital manner instead of in an analogue manner. Also the application of the defined force on the lever may be carried out in an automated manner, in particular electromechanically or electropneumatically. Moreover, storage media may be provided in order to make the measured values, which have been measured, readily available later.

Naturally, the rudder unit may also comprise the bearing fitting and the rudder may also comprise the bearing fork.

The present invention relates to a measuring arrangement for measuring clearance between a bearing internal part and a bearing external part of a bearing, in particular in an aircraft or spacecraft. The idea underlying the invention is to adjust the bearing internal part relative to the bearing external part by means of an adjusting device and to measure the adjustment carried out by means of a measuring device. The advantage according to the invention is that by means of the invention a much more accurate and repeatable measurement may be achieved relative to current measuring which depends on the intuition and experience of a mechanic.

What is claimed is:

1. A measuring arrangement for measuring clearance between a bearing internal part and a fixed bearing external part of a bearing, in particular in an aircraft or spacecraft, the measuring arrangement comprising an adjusting device for adjusting the bearing internal part relative to the fixed bearing external part and a measuring device for measuring the adjustment carried out, wherein the adjusting device comprises a measuring element which is securable in the bearing internal part, wherein the measuring element is configured as a measuring bolt which is insertable into a bore of the bearing internal part, wherein the adjusting device comprises an engagement means which can brought into engagement with the measuring element, wherein the adjusting device comprises a rotational axis about which the engagement means is pivotable to carry out the adjusting of the bearing internal part relative to the fixed bearing external part, wherein the adjusting of the bearing internal member is carried out radially with respect to the fixed bearing external part, wherein the engagement means comprises at least one jaw part for partially engaging around the measuring bolt on its circumference, wherein the at least one jaw part is configured to be flat, such that it is insertable between a bearing fitting and a bearing fork of the bearing towards the measuring bolt.

2. The measuring arrangement according to claim 1, wherein the adjusting device acts directly on the bearing internal part.

3. The measuring arrangement according to claim 1, wherein the adjusting device comprises fastening means on its rotational axis, by means of which the adjusting device is securable to a bearing fitting of the bearing.

4. The measuring arrangement according to claim 3, wherein the fastening means are configured as a clamping device for clamping the adjusting device to the bearing fitting.

5. The measuring arrangement according to claim 1, wherein a force measuring device is provided for a repeatable measurement of the adjustment, by which a force applied by the adjusting device to the bearing internal part is measurable.

6. The measuring arrangement according to claim 5, wherein the force measuring device is configured as a resilient lever by which the engagement means is pivotable about the rotational axis.

7. The measuring arrangement according to claim 5 or 6, wherein a force which is divertable from a resilient deformation of the resilient lever is readable on a scale of the force measuring device.

8. The measuring arrangement according to claim 1, wherein the engagement means comprises two jaw parts for engaging around the measuring bolt at opposing ends.

9. The measuring arrangement according to claim 1, wherein the adjusting device comprises positioning means within its rotational axis for positioning the adjusting device relative to the bearing external part.

10. The measuring arrangement according to claim 1, wherein the measuring device is configured as a dial gauge.

11. The measuring arrangement according to claim 10, wherein the dial gauge comprises a measuring sensor which can be positioned under spring tension on the measuring element or the bearing internal part.

12. The measuring arrangement according to claim 11, wherein the measuring sensor is insertable into a recess in the measuring bolt and can be positioned on an internal wall of the bearing internal part.

13. A method for measuring clearance between a bearing internal part and a fixed bearing external part, which are fitted in an aircraft or spacecraft, comprising the following method steps:
 adjusting the bearing internal part from a first bearing position of the bearing internal part on the bearing external part to a second bearing position on the bearing external part opposing the first bearing position by means of an adjusting device for adjusting the bearing internal part relative to the bearing external part;
 measuring the adjustment with a measuring device;
 wherein a bearing bolt of the bearing is replaced before the adjustment of the bearing internal part relative to the bearing external part by a measuring element;
 wherein after the replacement of the bearing bolt by the measuring element, said measuring element is brought into engagement with an engagement means of the adjusting devices; and
 wherein the engagement means for adjusting the bearing internal part is pivoted from the first bearing position into the second bearing position, wherein the bearing internal part is adjusted radially with respect to the fixed bearing external part.

14. The method according to claim 13, wherein at the first and second bearing position respectively the same amount of force is applied to the bearing internal part for pressing the bearing internal part against the bearing external part with the adjusting device.

\* \* \* \* \*